Jan. 3, 1939  W. R. WILEY  2,142,429
CLIP
Filed Nov. 9, 1936
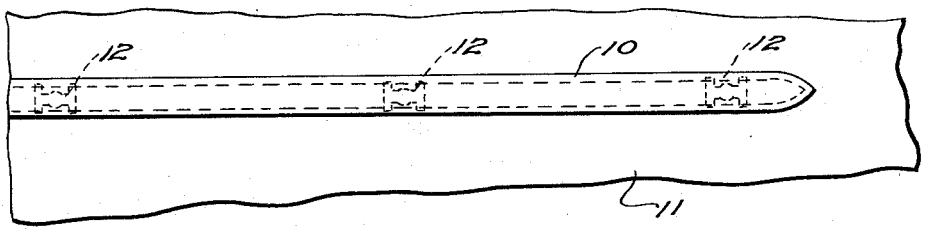
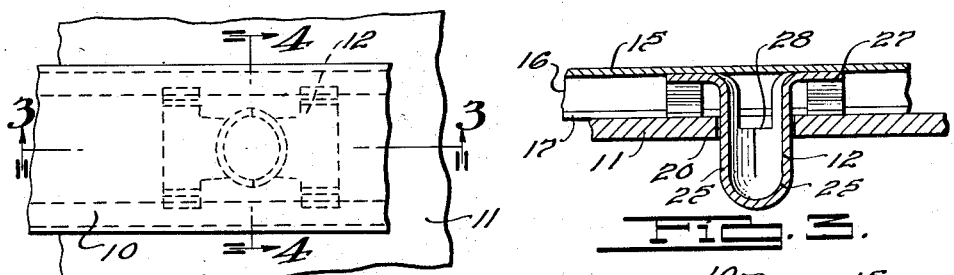
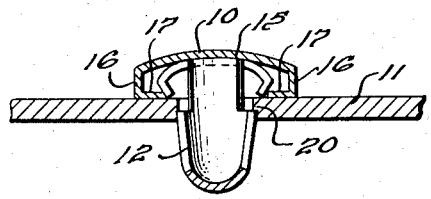
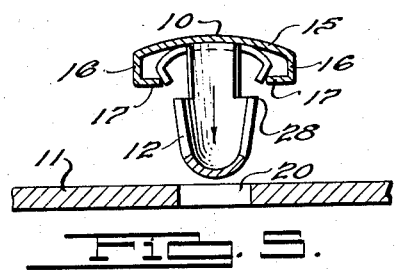
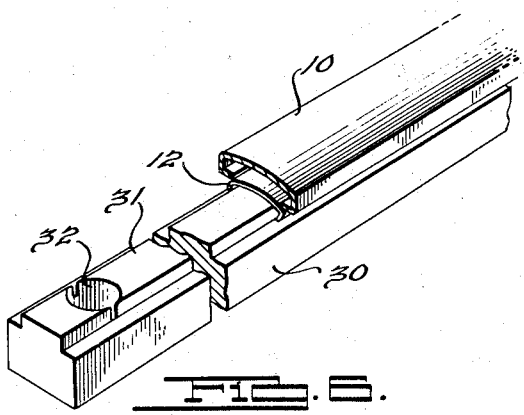
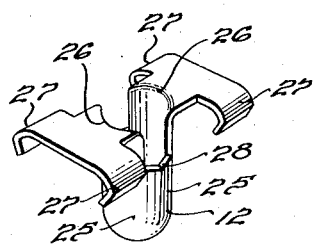
INVENTOR.
William R. Wiley.
BY
ATTORNEYS.

Patented Jan. 3, 1939

2,142,429

UNITED STATES PATENT OFFICE 2,142,429

CLIP

William R. Wiley, Detroit, Mich.

Application November 9, 1936, Serial No. 109,923

6 Claims. (Cl. 189—88)

This invention relates to clips. More particularly it relates to a novel and improved type of clip primarily designed for permanently retaining molding strips in position upon sheet metal panels.

In conventional present day automotive vehicles, it is customary in many instances to mount decorative molding strips upon the surface of the body panels in order to improve the general appearance of the vehicle body as a whole. The clips of the present invention are primarily designed for the purpose of providing exceptionally neat, convenient, and satisfactory means for positively and permanently retaining these molding strips in position.

It is a primary object of the present invention to provide a mounting clip of this general type which is of such construction that it serves to positively seal the hole in which it is mounted, thus providing a substantially water tight joint and precluding entrance of water interiorly of the body through the hole in which the clip is mounted.

It is a still further object of the present invention to provide a clip of this generic type which is so constructed that it has particularly novel and positive means not only for engaging the molding strip which it serves to mount but also for positively anchoring such molding strip in position in respect to the panel with which it is to be associated.

Yet another object of the present invention is to provide a clip which is relatively simple in form and which includes elements establishing a positive locking relation between the clips and the molding strip with which it is associated.

Still further, the present invention contemplates the construction of a clip which is particularly simply and easily applied to both the molding strip and the metal panel upon which it is mounted and which serves to positively retain the molding strip closely in engagement with the sheet metal panel throughout the entire length of the molding strip.

Many other and further objects, advantages, and features of the present invention will become more clearly apparent from the following specification when considered in connection with the accompanying drawing forming a part thereof.

In the drawing:

Figure 1 is a fragmentary side elevational view of a portion of the surface of a vehicle body illustrating one of the improved molding strips mounted in position thereon by means of the clips of the present invention;

Fig. 2 is an enlarged fragmentary elevational view similar to Fig. 1, illustrating in detail a portion of the molding strip and one of the clips for securing it in position.

Fig. 3 is a sectional view taken substantially on the line 3—3 of Fig. 2, illustrating in detail the manner in which the improved clip is disposed within the molding strip and anchored within the sheet metal panel.

Fig. 4 is a sectional view taken substantially on the line 4—4 of Fig. 2, illustrating in further detail the manner in which the molding strip is anchored in position by means of the improved clip.

Fig. 5 is a fragmentary sectional view similar to Fig. 4 illustrating in detail the manner in which the molding strip is mounted in position.

Fig. 6 is a fragmentary perspective view of one form of apparatus primarily designed for the purpose of mounting the clips at predetermined intervals within a molding strip.

Fig. 7 is an enlarged perspective view of one of the improved clips of the present invention.

With more particular reference to the drawing and to the specific embodiments of the invention illustrated in detail therein, it will be understood that a particular specific form of clip is illustrated and described in detail below and that this particular form of clip is adapted for association with a particular specific form of molding strip such as is now conventional in vehicle body constructions generally. It will be appreciated that the clip of the present invention may be modified substantially in order to adapt it for insertion into molding strips of many and various kinds without departing from the generic scope of the invention presented herein.

Molding strips of the character disclosed in the present application find wide and practical utility for providing ornamental decoration and also for concealing joints on automotive vehicle bodies. In Fig. 1 it is seen that a molding strip 10 is secured in position upon a metal panel 11 by means of a plurality of clips generally designated as 12 and described in detail below.

The specific form of molding strip illustrated in the embodiment of the invention and shown in the drawing is preferably made from a continuous length of rolled section of substantially uniform cross section. Strips of this general character usually comprise an arcuate body portion 14 providing an ornamental exposed surface side portions or walls 16 which side portions or walls are provided in their marginal edges with inturned flanges 17, which flanges are bent to lie in substantially the same plane and are adapted to seat tightly against the panel 11 when the strip is mounted in predetermined position. The panel 11 is provided at suitable intervals with substantially circular apertures 20 which serve to receive the clips hereinafter described in detail and it will be readily understood from the following that it is considered an extremely important feature of the present invention that these apertures may vary within relatively wide limits as to size without materially interfering with the nature of the interlocking engagement provided by the improved clips.

The clips forming the subject matter of the present invention are preferably formed from a single integral sheet metal stamping made from relatively high carbon steel, which, after being formed, is heat treated or otewise tempered in order that it will be substantially harder than the sheet metal panel and molding strip with which it is associated and which heat treating or tempering serves to materially increase the resilience and elasticity of the clip as a whole, which features are considered extremely important in connection with the present invention.

The clips will, of course, be formed commercially by means of suitable dies and the metal from which the clips are formed is bent upon itself to provide a pair of arcuately shaped sections 25, the edges of which are brought together in abutting relation. These two sections are integrally secured together by a rounded connecting portion forming a rounded base for the clip as a whole. The members 25 together form a structure which slopes outwardly from the base, upward. These arcuate sections 25 are preferably bent transversely along arcs of varying, gradually increasing radius from the base portion upward and on the whole are formed on arcs of slightly greater radius than the radius of the holes 20 in which this portion of the clip is adapted to seat and lock. The arcuate portions 25 of the clip are preferably bent in such a manner that after the clip has been completely formed, the over-all diameter of the protruding portion formed by the sections 25 will be slightly greater transversely than longitudinally of the clip and the mean diameter of this projecting portion will be substantially the same as that of the aperture 20 in which it is adapted to seat.

The arcuate portions 25 each have an upwardly extending, integrally formed tongue 26, which tongues are bent to lie substantially in the same plane and are provided at their extreme ends with laterally projecting ears or lugs 27, which, as will hereinafter be seen, serve to retain the clip seated within the molding strip 10 which they serve to mount.

It will be seen that the point at which the tongues 26 join the arcuate portions 25 that these tongues are of substantially less width than the arcuate portions, thereby leaving exposed upper marginal edges or shoulders 28 on each of the arcuate portions on each side of the projecting tongues. These shoulders 28 have been found to play an extremely important part in firmly locking the central portion of the clips to the paneling with which they are to be associated and the function thereof will hereinafter become more clear. The lugs or ears 27, which serve to retain the clip seated within the molding strip, have their extremities bent downwardly toward each other to afford a maximum grip upon the molding strip and serve to retain the molding strip fixed in position without permitting any relative movement between the clips and the molding strip in which they are mounted.

In practical use, a bar 30 is preferably utilized for mounting the clips within the molding strip. This bar has a raised central portion 31 of a width slightly less than the distance between the extremities of the lugs 27 and at suitable intervals therealong is provided with apertures 32 adapted to receive the central mating arcuate sections 25.

These apertures 32 are substantially larger than the mating central portions of the clips in order that the clips may loosely be seated within these apertures and the extremities of the lugs 27 will lie on the surface of the bar on either side of the raised central portion 31 thereof. The bar 30 is provided with these apertures 32 at intervals corresponding to the intervals at which the holes 20 are bored in the sheet metal panel 11. The molding strip 10 may be placed in position upon the bar 30 and pressed downwardly and the marginal edges thereof will snap over the lugs 27 of the clips and these lugs will be compressed to some substantial extent, thus firmly positioning the clips within the molding strip. It will be seen that any tendency to remove the clips from the molding strip will cause a further locking engagement of the lugs with the flanges 17 of the molding trip and thus serve to anchor the clips tightly in position. The mere frictional engagement of the clips with the molding strip serves to maintain them in predetermined longitudinal position with respect thereto and consequently the molding strip carrying the clips may be applied to the panel 11 as a unit. This molding strip is pressed tightly down against the panel and the projecting central portions of each of the clips will seat in the apertures 20 in the panel. As these central portions are pressed into these apertures, the arcuate portions 25 will be bent to arcs of slightly smaller radius than that which they have a normal tendency to assume and will consequently cause a tight locking engagement with the apertures 20 in which they are seated. The molding strip is pressed down until the under side of the flanges tightly engage the surface of the panel 11, as is clearly seen in Figure 4. At this time it will be seen that the parts of the clip have been so proportioned that the upper marginal edges or shoulders 28 of the arcuate sections 25 will be located intermediate the inner and outer surfaces of the panel. These relatively sharp shoulders serve to dig into the softer metal of the panel and effect a tight locking engagement in addition to the inherent locking engagement provided by the tension of the arcuate sections making up this central portion of the clip.

It is a particular salient advantage of the clips of the present invention that when inserted into the apertures 20 they snugly fit against the wall of the aperture and provide a water-tight joint, thus precluding the entrance of any moisture which may enter under the molding strip from obtaining access to the interior of the panel 11. After the molding strip is pushed down against the panel, the central portion thereof becomes more and more firmly locked in the paneling and retains the molding strip firmly in position adjacent the panel.

While but one embodiment of the invention has been illustrated and described above, it will be readily understood that this embodiment is merely illustrative of the generic inventive concept presented in this application. Many other and further modifications of the invention, falling within the scope thereof as defined in the subjoined claims, will become clearly apparent to those skilled in the art.

What is claimed is:

1. In combination, a sheet metal panel having apertures therein, a molding strip and clips for securing said molding strip to said panel, said clips having a generally tubular central portion adapted to seat in and close the apertures in said panel, and means formed on said clips adapted for locking engagement with said molding strip, the tubular central portion of said clips being generally elliptical in cross section and having a mean diameter substantially the same as the apertures in which they are adapted to seat.

2. In combination, a sheet metal panel having apertures therein, a channeled molding strip and a clip for securing said molding strip to said sheet metal panel, said clip including arms adapted for locking engagement with said molding strip, and a generally tubular central portion adapted for locking engagement with the aperture in said panel, said tubular central portion having edges adapted to engage the walls of the aperture in said panel.

3. In combination, a sheet metal panel having apertures therein, a channeled molding strip and a clip for securing said molding strip to said sheet metal panel, said clip including arms adapted for locking engagement with said molding strip, and a generally tubular central portion adapted for locking engagement with the aperture in said panel, said tubular central portion comprising an integrally connected pair of facing, transversely arcuate sections normalized upon a radius of curvature greater than the radius of the aperture in said panel at the point where the same are adapted to engage said panel.

4. A clip for mounting a member on a sheet metal panel having an aperture therein, said clip comprising a section of sheet metal bent upon itself in its central portion to provide a pair of gradually divergent sections bent transversely along arcs of slightly greater radius than the aperture in said panel whereby to lock said clip in position in said panel.

5. A clip for securing a generally channel shaped molding strip in position upon a sheet metal panel having an aperture therein, said clip being formed of a single integral section of sheet metal and having a generally tubular central portion adapted to seat in and close the aperture in said panel, means formed on said clip adapted to seat in locking engagement within the channel of said molding strip, the tubular central portion of said clip being generally elliptical in cross section and having a mean diameter substantially the same as the aperture in which it is adapted to seat.

6. A clip for securing a generally channel shaped molding strip in position with respect to the sheet metal panel having an aperture therein, said clip including arms adapted for locking engagement with the interior of said channel shaped molding strip and a generally tubular central portion adapted to seat within and close the aperture in said panel, said tubular central portion having edges adapted to engage the walls of the aperture in said panel to secure the clip in position therein.

WILLIAM R. WILEY.